United States Patent
Olsen et al.

(10) Patent No.: US 9,140,420 B2
(45) Date of Patent: Sep. 22, 2015

(54) EDGE-LIT LIGHT PANEL HAVING A DOWNLIGHT WITHIN A LINED INDENTATION IN THE PANEL

(75) Inventors: Joseph Allen Olsen, Gloucester, MA (US); Michael Quilici, Essex, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 102 days.

(21) Appl. No.: 13/159,907

(22) Filed: Jun. 14, 2011

(65) Prior Publication Data

US 2012/0320588 A1   Dec. 20, 2012

(51) Int. Cl.
| | |
|---|---|
| *F21S 8/02* | (2006.01) |
| *F21S 8/04* | (2006.01) |
| *F21Y 101/02* | (2006.01) |
| *F21Y 113/00* | (2006.01) |
| *F21V 8/00* | (2006.01) |

(52) U.S. Cl.
CPC .............. *F21S 8/026* (2013.01); *F21S 8/046* (2013.01); *F21Y 2101/02* (2013.01); *F21Y 2113/00* (2013.01); *G02B 6/0068* (2013.01); *G02B 6/0073* (2013.01)

(58) Field of Classification Search
CPC ...... F21S 8/026; F21S 8/046; F21Y 2101/02; F21Y 2113/00; G02B 6/0073; G02B 6/0068
USPC .............. 362/85, 147, 404, 576, 558
See application file for complete search history.

(56) References Cited

U.S. PATENT DOCUMENTS

| | | | |
|---|---|---|---|
| 4,223,374 A | * | 9/1980 | Kimmel .................. 362/556 |
| 4,811,507 A | * | 3/1989 | Blanchet ................. 40/546 |
| 5,416,684 A | * | 5/1995 | Pearce .................... 362/340 |
| 5,857,761 A | * | 1/1999 | Abe et al. ................ 362/551 |
| 5,905,442 A | * | 5/1999 | Mosebrook et al. ........ 340/3.7 |

(Continued)

FOREIGN PATENT DOCUMENTS

| | | |
|---|---|---|
| DE | 19529054 A1 | 2/1997 |
| DE | 10112055 A1 | 10/2002 |

(Continued)

OTHER PUBLICATIONS

Machine Translation by EPO and Google of specification of EP2096351 published Sep. 2, 2009 by Zumtobel Lighting GmbH.

(Continued)

*Primary Examiner* — John A Ward
(74) *Attorney, Agent, or Firm* — Andrew Martin

(57) ABSTRACT

A light fixture and method for producing downward-propagating illumination are disclosed. A downward-facing panel may produce diffuse light. The panel may be generally flat and may have an indentation, where the indentation may have a lining that also produces diffuse light. The panel and the lining may have essentially the same luminance, so that the indentation may be less visible for orientations other than directly below the indentation. The fixture may have a downlight recessed into the indentation, which may produce a directional beam that emerges downward from within the indentation. The directional beam may have a brightness controllable separately from the diffuse light, such as a dedicated dimmer switch. The indentation may be at the center of the panel. The panel may be incorporated into a ceiling tile, and may be bundled as part of a kit that can also include ceiling tiles with panels that don't have a downlight.

20 Claims, 10 Drawing Sheets

(56) References Cited

U.S. PATENT DOCUMENTS

| | | | | |
|---|---|---|---|---|
| 6,037,721 A | * | 3/2000 | Lansing et al. | 315/295 |
| 6,161,939 A | * | 12/2000 | Bansbach | 362/223 |
| 6,667,578 B2 | * | 12/2003 | Lansing et al. | 315/119 |
| 6,794,830 B2 | * | 9/2004 | Lansing et al. | 315/291 |
| 6,837,588 B2 | * | 1/2005 | Kunimochi et al. | 362/617 |
| 2001/0040805 A1 | * | 11/2001 | Lansing et al. | 362/276 |
| 2003/0090887 A1 | * | 5/2003 | Igarashi et al. | 362/31 |
| 2008/0055931 A1 | * | 3/2008 | Verstraete et al. | 362/612 |

FOREIGN PATENT DOCUMENTS

| | | |
|---|---|---|
| DE | 20122412 U1 | 9/2005 |
| EP | 2096351 A2 | 9/2009 |

OTHER PUBLICATIONS

PCT/US2012/040270 International Search Report mailed Oct. 16, 2012.

Machine Translation by EPO and Google of specification of DE10112055 published Oct. 2, 2002 by Wila Patent and Lizenzgmbh.

Machine Translation by EPO and Google of specification of DE20122412 published Sep. 1, 2005 by Zumtobel Staff GmbH.

Machine Translation by EPO and Google of specification of DE19529054 published Feb. 6, 1997 by Seperlux GmbH.

\* cited by examiner

US 9,140,420 B2

EDGE-LIT LIGHT PANEL HAVING A DOWNLIGHT WITHIN A LINED INDENTATION IN THE PANEL

TECHNICAL FIELD

The present invention relates to edge-lit light fixtures that produce both diffuse light and a directional beam, while maintaining a uniform external appearance.

BACKGROUND OF THE INVENTION

Light emitting diodes (LEDs) are becoming more commonplace in general illumination applications, such as office spaces and conference rooms. For example, an edge-lit panel uses LEDs as its light source, and is become increasingly common for ceiling-based applications, such as incorporation into ceiling tiles. While edge-lit panels tend to have a pleasing, uniform external appearance, such edge-lit panels tend to produce only diffuse light.

There are some instances where a user may want to use an additional directional beam, such as a spotlight or accent light, for illuminating a particular task or space. Typically, the user has to install a separate fixture that provides such a directional beam, often referred to as a downlight. Use of a separate fixture is unwieldy, and may not be aesthetically pleasing.

Early attempts to incorporate a downlight source into an edge-lit fixture involved cutting a hole directly through the fixture, placing the downlight in the hole, and using a bezel or mask to hide the edge where the hole is cut. These attempts may have produced both the diffuse light and the directional beam, but they lacked the pleasing, uniform external appearance of the uncut edge-lit panel.

Accordingly, there exists a need for a single light fixture that can produce both diffuse light and a directional beam, while maintaining a uniform external appearance.

SUMMARY OF THE INVENTION

An embodiment is a light fixture for producing downward-propagating illumination. A downward-facing panel produces diffuse light. The panel is generally flat and has an indentation. The indentation has a lining that produces diffuse light. The panel and the lining have essentially the same luminance. A downlight is recessed into the indentation. The downlight produces a directional beam that emerges downward from within the indentation. The directional beam has a luminance controllable separately from the diffuse light.

Another embodiment is a light fixture for producing downward-propagating illumination. A generally flat downward-facing light-emitting surface has a central portion and has an upward-extending indentation in the central portion. The light-emitting surface extends upward at least partially into the indentation. The light-emitting surface has an aperture at the apex of the indentation. A downlight is disposed within the aperture. The downlight emits a directional beam downward out of the light fixture through the indentation. The downlight has a luminance that is controllable and is independent of a luminance of the light-emitting surface.

A further embodiment is a method for disguising a downlight in a downward-facing flat-panel light fixture. The method includes: providing a generally flat downward-facing light-emitting surface on the light fixture; providing an indentation in a central portion of the light-emitting surface, the light-emitting surface extending upward at least partially into the indentation; providing an aperture at the center of the indentation; and providing a downlight disposed within the aperture, the downlight emitting a directional beam out of the light fixture downward through the indentation. The downlight has a luminance that is controllable and is independent of a luminance of the light-emitting surface. The downlight itself is visible only over a limited area directly underneath the indentation.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION OF THE INVENTION

Figure 1:
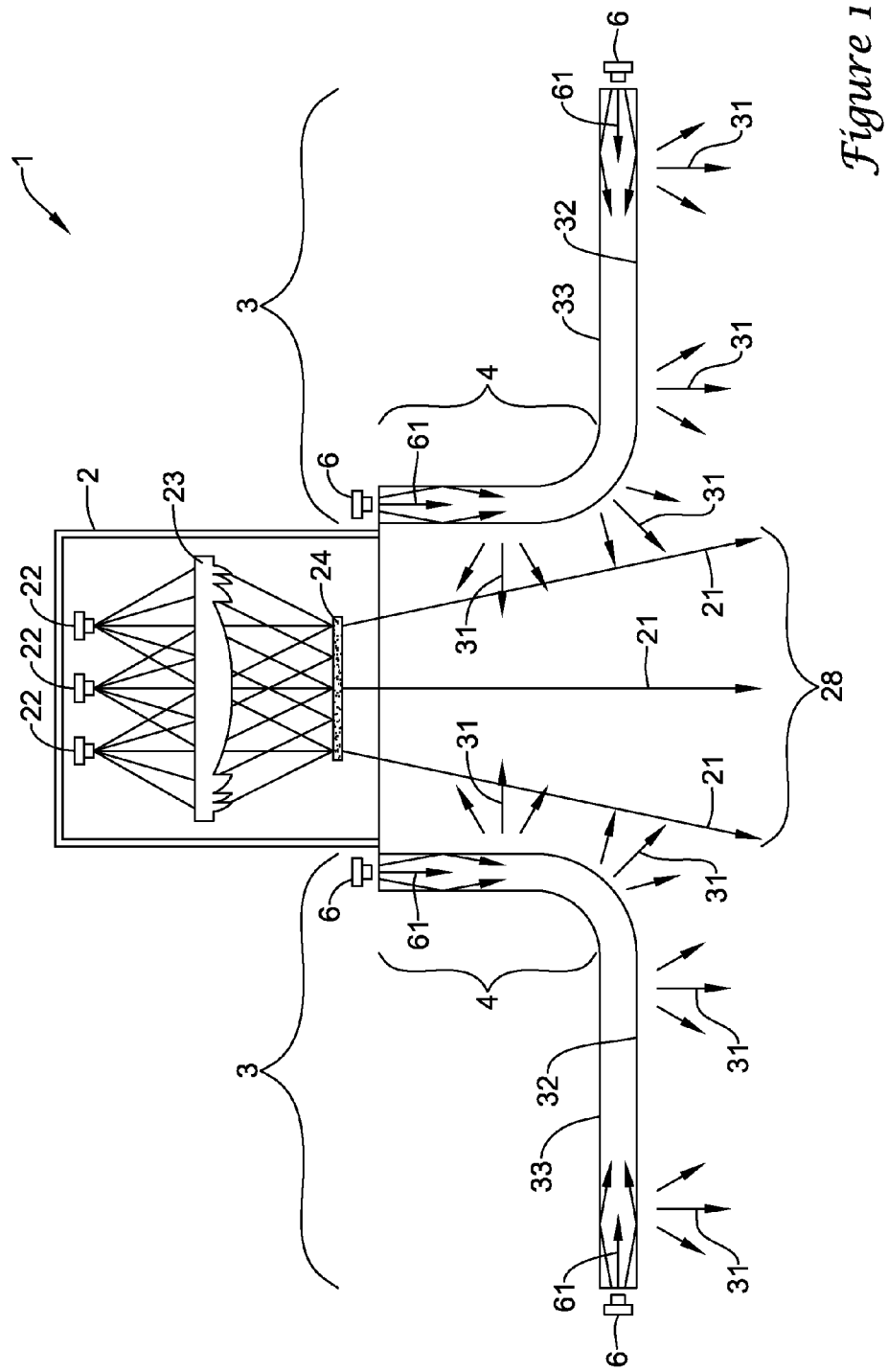
FIG. 1 is a cross-sectional drawing of an example light fixture.

In this document, the directional terms "up", "down", "top", "bottom", "side", "lateral", "longitudinal" and the like are used to describe the absolute and relative orientations of particular elements. For these descriptions, it is assumed that the light fixture is mounted overhead, such as being incorporated into a ceiling tile or ceiling grid, and that the light fixture directs its output generally downward toward a user. It will be understood that while such descriptions provide orientations that occur in typical use, other orientations are certainly possible. For instance, the fixture may be wall-mounted or incorporated into additional elements to provide indirect lighting. The noted descriptive terms, as used herein, still apply to the fixture, even if the fixture has an orientation other than overhead, or is uninstalled in its overhead orientation.

A light fixture and method for producing downward-propagating illumination are disclosed. A downward-facing panel may produce diffuse light. The panel may be generally flat and may have an indentation, where the indentation may have a lining that also produces diffuse light. The lining may be integrated with the panel, and may be a bent portion of the panel that lines the inside of the indentation, or may alternatively be a separate element from the panel. Note that the lining may be referred to as a "downlight wall", a "cavity wall" a "void wall", or an "aperture wall". The panel and the lining may have essentially the same luminance, so that the indentation may be less visible for orientations other than directly below the indentation. The fixture may have a downlight recessed into the indentation, which may produce a directional beam that emerges downward from within the indentation. The directional beam may have a luminance controllable separately from the diffuse light, such as a dedicated dimmer switch. The indentation may be at the center of the panel. The panel may be incorporated into a ceiling tile, and may be bundled as part of a kit that can also include ceiling tiles with panels that don't have a downlight.

For reference, an example of diffuse light is the reflection from a movie screen, which is roughly independent of the angle from which the projected light strikes the screen, and has a relatively small angular dependence so that viewers sitting in the center of the theater don't see a significantly brighter image than viewers at the lateral edges of the theater. Typical older fluorescent overhead lighting fixtures may use a textured lens to randomize the direction of the output of the fluorescent bulbs, so that the illumination does not have a strong angular dependence. For overhead lighting fixtures, diffuse lighting may be desirable because it does not have "hot spots" in its illumination pattern. Similarly, an example of a directional beam is that from a typical flashlight or a spotlight. In some cases, there may be an angular spread to the beam, so that the beam footprint may expand with distance away from the source. Such a directional beam may be desirable for accents, such as illumination of a picture on a wall, or for other visual effect. A directional beam may produce a distinct "hot spot" in its illumination pattern. The light fixture 1 of FIG. 1 may produce both diffuse light 31 and a directional beam 21, optionally with separate controllers for each.

The light fixture 1 of FIG. 1 may include a downward-facing panel 3 that produces diffuse light 31. The panel 3 may be generally flat and may have an indentation, typically in its center. The indentation may have a lining 4 that may also produce diffuse light 31. Within the indentation, typically at the top or apex of the indentation, is a downlight 2, which may produce a directional beam 21. Note that such a lined indentation may be advantageous, compared to an un-lined indentation or a hole, because the diffuse light produced by the lining 4 may help mask or disguise the downlight 2 when the downlight is off or at a reduced luminance. The downlight 2 is described in detail below, following a description of a typical panel 3.

The term "panel", as used in this document, may include several optical elements, such as one or more light sources, a light guide that distributes light from the sources over a particular area, a light extractor on one side of the light guide that extracts a desired, predetermined amount of light out of the light guide, and a diffuser that receives the extracted light and randomizes its direction. The panel may optionally also include a reflector on or near the light guide on the side opposite the extractor and diffuser. For typical panels known in the art, the panels are often generally flat and generally featureless over their rectangular, elliptical or round areas, so that the diffuse light produced by the panel is roughly uniform over the panel area. Unlike known panels, the panel 3 described herein is designed to accommodate and disguise the downlight 2, and may be bent upward to form a cylindrical, conic, or funnel-shaped indentation in its center, with the downlight 2 being disposed at the top or apex of the indentation.

The panel 3 may include a lightguide, which may be a sheet of transparent material, such as PMMA. The lightguide may be thick enough to support itself without bending, or may be thin enough to be bendable. In general, the lightguide may be generally planar, optionally with one or more predetermined wedge angles that in some cases may beneficially affect the output properties from the fixture 1. The shape, or footprint, of the lightguide may be rectangular, square, round, elliptical or any other suitable shape. In some cases, the footprint of the lightguide may be matched to the size of a ceiling tile, such as two feet by two feet, or two feet by four feet. The lightguide may occupy the entire area allocated for the ceiling tile, or may have a border around its perimeter.

The lightguide may receive light emitted by a series of LEDs 6. Some of the LEDs may be distributed around the perimeter of the lightguide, and some may be distributed around the perimeter of the indentation. The output of the LEDs 6 may be oriented laterally, with respect to the lightguide. Each LED 6 may be a bare chip, or may have a lens, such as a hemisphere or partial sphere, mounted on it to reduce the angular divergence from the LED 6.

The emitted light from each LED 6 enters a lateral edge of the lightguide, typically with an angular distribution centered about a local surface normal. Once inside the lightguide, the light may be referred to in this document as "internal" light 61. Note that this may be referred to as edge-lit technology, which has been used in backlighting of liquid crystal displays (LCDs) and in flat panel lighting.

The internal light then progresses inward from the lateral edge or edges of the lightguide by reflecting off the front and rear surfaces of the lightguide. The reflections are typically total internal reflections, for which the angle of incidence exceeds the critical angle, and for which 100% of the optical power is reflected. For a lightguide having a refractive index of n, and an air/lightguide interface, the critical angle is given by $\sin^{-1}(1/n)$, which is measured inside the lightguide with respect to the local surface normal at the interface. Note that for a refractive index greater than the square root of 2 (approximately 1.41), all the internal light that enters through a lateral edge will totally internally reflect at an orthogonal lateral edge. Such is the case for typical lightguide materials, such as PMMA, which has a refractive index of 1.503 at a wavelength of 435.8 nm and 1.486 at 700 nm.

In order to extract some of the light from the lightguide, the lightguide may have a so-called "light extractor". The light extractor is typically on the bottom surface of the lightguide, but may alternately or additionally be on the top surface or embedded within the lightguide. Such a light extractor is designed to redirect out of the lightguide a predetermined portion or fraction of the internal light at each location over the area of the lightguide. In general, it may be desirable to have a uniform or nearly uniform amount of power exiting the fixture, or, in some cases, incident at each point on the diffuser. As a result, the light extractor is usually designed to redirect more light, percentage-wise, from the center of the lightguide, compared with at the edge of the lightguide. The properties of the light extractor are controllable as a function of location, and are generally determined in advance by simulation of the optical system of the fixture 1. Such simulation may include multiple bounces within the lightguide, and bounces off the lateral edges of the lightguide.

There are a number of options available for the light extractor. A common option is a series of printed dots on the bottom surface of the lightguide. The dot pattern may be determined beforehand by simulation, prior to the production of the actual parts. Another option includes a series of prismatic surfaces on the bottom surface of the lightguide, which may be regular or irregular in one or both directions, and may have an apex angle of greater or less than 90 degrees. A further option may be the selective roughening of the bottom surface of the lightguide. As a specific example, the light extractor may be a series of regularly spaced dots on either side of the lightguide; in practice, the size and spacing of dots may vary across the lightguide surface, in order to extract more light, percentage-wise from the interior of the lightguide, compared with at the edge. The light extractor may be disposed on the bottom surface 32 of the panel 3, as in FIG. 1, or may alternately be on the top surface of the panel, or on both surfaces.

Light emerging out of the lightguide from the light extractor may be referred to as "external" light. The external light may have an asymmetric angular profile, generally with more light propagating at high angles of exitance than at small angles of exitance (both made with respect to a surface normal with respect to the plane of the lightguide). Such an angular profile would be generally unacceptable as the output for a lighting fixture, so the fixture 1 may use a diffuser to receive the external light, randomize the propagation directions for the particular rays, and output diffuse light 31.

The diffuse light 31 may have a more symmetric angular profile than the external light. In some cases, the diffuse light 31 may have a Lambertian distribution, with the angular output peaking in the downward direction, and the angular output falling to zero at the plane parallel to the lightguide. The angular distribution of the diffuse light 31 is controlled by the properties of the diffuser, which may be determined by simulation prior to the building of any of the parts for the fixture 1. In general, the weaker the diffuser, the more the diffuse light 31 resembles the external light; the stronger the diffuser, the more the diffuse light 31 resembles a Lambertian distribution.

One example of a diffuser is a volumetric element that has a background material, and particles immersed in the background material, where the particles have a different refractive index from the background material. Such a diffuser produces a multitude of interactions for each light ray that passes through it, where each time a ray enters or leaves one of the particles, it experiences a deviation in path due to refraction at each interface, and experiences a slight splitting in which a portion is split off to its path due to a small reflection at each interface. The individual refraction and splitting interactions may be quite small, but the combined effects of many of these interactions is to effectively randomize the output angle of a particular ray, regardless of the specific input angle of the ray.

The particles may be relatively small, on the order of five microns (0.005 mm) or larger. The particles may have roughly the same size, or may have a distribution of different sizes. The particles may all have the same shape, optionally with a predetermined alignment of the particles. The particles may alternatively all have different shapes and/or sizes. The difference in refractive index between the particles and the background material may be relatively small, such as on the order of 0.001 or larger. The particles may be referred to as "scattering" particles.

Other types of diffusers are possible, including elements having one or more roughened surfaces. The diffuser may also be disposed on the bottom surface 32 of the panel 3 in FIG. 1, or may optionally be separated from the light extractor.

There may be an additional reflector on or near the top surface of the lightguide, to redirect any errant light that inadvertently exits the top surface of the lightguide. Such errant light may be redirected to be part of the output from the fixture 1. This errant light may be treated in the simulation stage of the fixture 1. The optional reflector may be disposed on the top surface 33 of the panel 3 in FIG. 1.

Outside the indentation, the panel 3 may be generally flat. Inside the indentation, the panel 3 may include a lining 4 that extends up at least a portion of the indentation. In the example of FIG. 1, the indentation may be generally cylindrical, with the downlight 2 disposed at the top of the cylinder, and the lining 4 extending up at least a portion of a lateral wall of the cylinder.

In general, the lining 4 may either be made integral with the panel 3, as shown in FIG. 1, or may be a separate element and disposed adjacent to the panel. In each case, it is intended that the diffuse light 31 from the lining 4 has the same or a similar surface luminance to that of the rest of the panel 3, so that the lining 4 appears to be as bright as the rest of the panel 3. In other words, the lining 4 may have the same luminance as the rest of the panel 3. The light extractor and diffuser on or near the bottom surface 32 of the panel may be designed in the simulation stage to accommodate the curved geometry of the panel 3.

Thus far, the description has concentrated mainly on the elements of the panel 3. The downlight 2 is now described.

In general, the function of a downlight 2 is to produce relatively strong illumination within a predetermined angular range, and relatively weak illumination outside the angular range. The output properties of such a downlight 2 may be somewhat more sophisticated than a typical incandescent spotlight, and may include photometric specifications, such as intensity as a function of propagation angle (usually given in candelas, cd), on-axis power/area as a function of distance to the illuminated plane (usually given in foot-candles, fc), and beam diameter as a function of distance to the illuminated plane (usually given in feet, ft). In some cases, the downlight 2 may include elements that allow for control over photometric quantities such as these, and may allow for optimization of one or more quantities or refinement of one or more quantities. For the example downlight 2 described below, the output may have generally uniform intensity (power/area) at a particular plane, a generally uniform angular output within a predetermined angular range, and a relatively small tail to the angular output at the edge of the angular range.

The light from the downlight 2 may be produced by one or more LEDs 22. In some cases, these LEDs 22 have the same spectral properties as the LEDs 6 that surround the lateral edge of the panel 3, so that the directional beam 21 and the diffuse light 31 may be perceived as being the same color. In other cases, the LEDs 22 may have a deliberately different spectrum than the LEDs 6, in order to produce an accenting effect in the directional beam 21. In some cases, the LEDs 22 may be phosphor-based white-light LEDs, with an example spectrum as show in the plot of FIG. 9. The downlight 2 may include a number of LEDs, including 1, 2, 3, 4, 5, 6, 7, 8, 9, 10, 12, 14, 16, 18, 20, 22, 24, or more than 24. Although three LEDs 22 are shown in the example of FIG. 1, it will be understood that any number of LEDs 22 may be used.

The LEDs 22 may be arranged in any suitable pattern, such as in a rectangular or polar grid. In general, the outer edge of the LED placement pattern helps determine the angular output of the directional beam 21. For instance, a generally round distribution of LEDs (i.e., roughly uniform distribution of LEDs having a circular outline), the directional beam 21 may be generally circularly symmetric. For an elongated distribution of LEDs, the directional beam 21 may also be elongated. Note that these two examples assume that the other optical elements are rotationally symmetric, where any asymmetries in the LEDs placement may be caused or corrected by other asymmetries in the other optical elements.

The output from each LED 22 diverges away from the respective LED 22, and is collected by a Fresnel lens 23. The plane of LEDs 22 is located at or near a front focal plane of the Fresnel lens 23, so that after the Fresnel lens 23, the light from each LED 22 may be collimated, but the light from each LED 22 may propagate at a different angle than the light from all the other LEDs 22. Note that a Fresnel lens 23 is drawn in FIG. 1, but any suitable lens may be used, including refractive and/or diffractive optics, binary optics (having squared-off portions at discrete levels between the steps, as opposed to the curved portions between the steps of the Fresnel lens 23), and/or an array of microlenses. In each case, the plane of the LEDs 22 may be placed at or near the front focal plane of the lens. Note that as a further alternative, the lens 23 may be omitted completely, and the downlight may retain only the LEDs 22, or the LEDs 22 and a diffuser 24.

At the rear focal plane of the Fresnel lens 23, there is a circle over which there is uniform illumination. Note that within this circle, each point in the circle receives light from every LED 22.

A downlight diffuser 24 may be placed at or near this rear focal plane of the Fresnel lens 23. This downlight diffuser 24 may be weaker than the diffuser disposed on the bottom of the panel 3 and described above, because the need for angular redistribution of the light may be much less than is required for the panel 3. For the diffuser on the panel 3, the external light may have a severe asymmetry that is converted by the diffuser into a relatively symmetric diffuse light 21. Unlike the diffuser on the panel 3, the downlight diffuser 24 merely performs a smoothing function on the angular distribution, rather than a drastic reshifting of angles.

To summarize the downlight 2, a plurality of downlight LEDs 22 may be longitudinally separated from the top face of the lightguide 3. A Fresnel lens 23 may be disposed longitudinally adjacent to the plurality of downlight LEDs 22. A downlight diffuser 24 may be disposed longitudinally adjacent to the Fresnel lens 23. Light from the plurality of downlight LEDs passing through the Fresnel lens 23 and the downlight diffuser 24 appears generally uniform when viewed at the downlight diffuser 24. In some cases, the plurality of downlight LEDs 22 may be disposed at a front focal plane of the Fresnel lens 23. In some cases, the downlight diffuser 24 may be disposed at a rear focal plane of the Fresnel lens 23. In some cases, an enclosure may laterally surround the volume between the plurality of downlight LEDs 22 and the downlight diffuser 24. In some cases, a heat sink (not shown) may be disposed on the enclosure. In some cases, circuitry (not shown) for driving the plurality of downlight LEDs 22 may be incorporated within the enclosure. In some cases, the downlight beam footprint 28 may be centered directly below the downlight 2, directly below the panel 3, and/or directly below the fixture 1.

While the panel indentation and the lining 4 and of FIG. 1 are generally cylindrical, with illuminating LEDs 6 disposed around the circumferences of both the lateral edge of the pane 13 and the top of the indentation, there are other shapes and configurations that may be used for the panel 3. FIGS. 2 to 7 show cross-sectional drawings of other example panels 3A-3F, where each panel 3A-3F may be used with the light fixture of FIG. 1.

Figure 2:
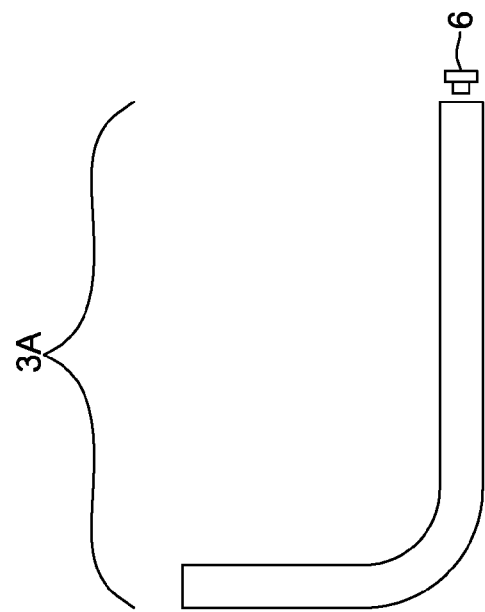
FIG. 2 is a cross-sectional drawing of an example panel for the light fixture of FIG. 1.
Figure 2:
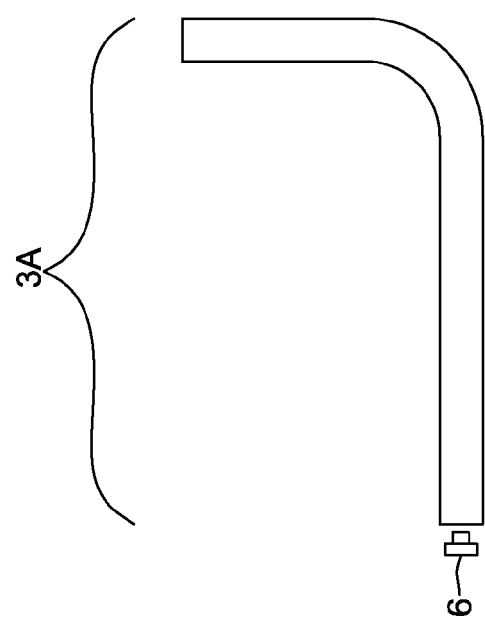
Figure 3:
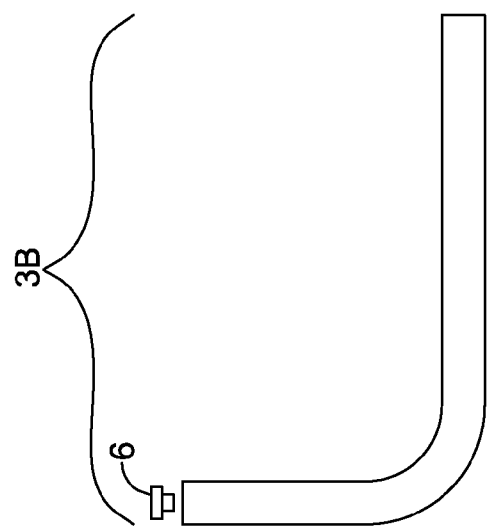
FIG. 3 is a cross-sectional drawing of another example panel for the light fixture of FIG. 1.
Figure 3:
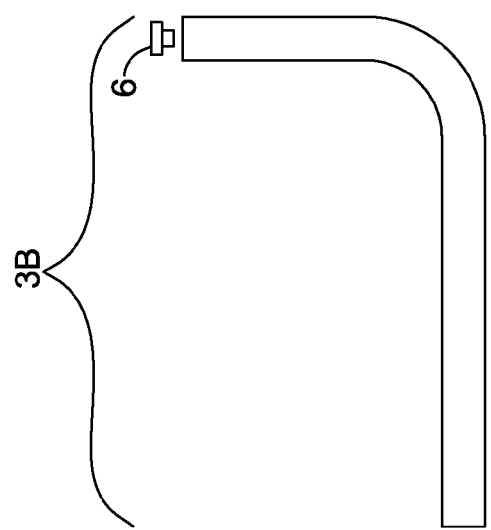
Figure 4:
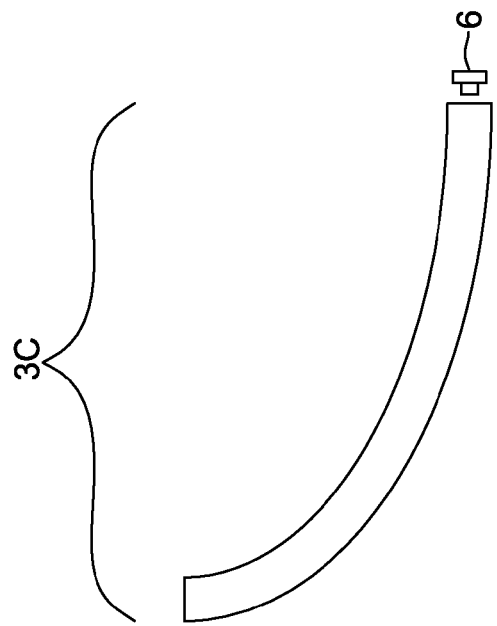
FIG. 4 is a cross-sectional drawing of another example panel for the light fixture of FIG. 1.
Figure 4:
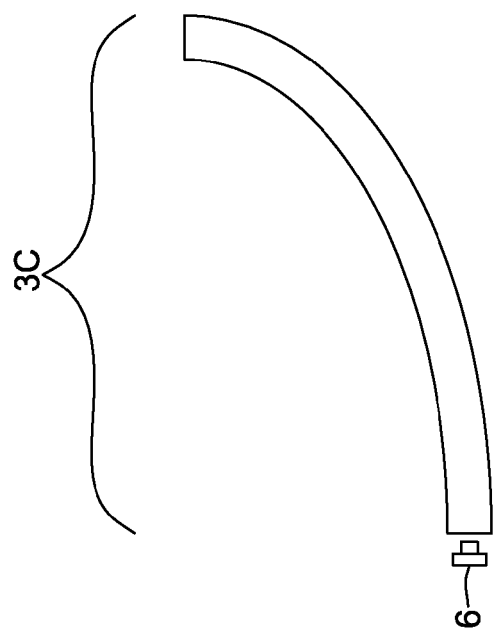
Figure 5:
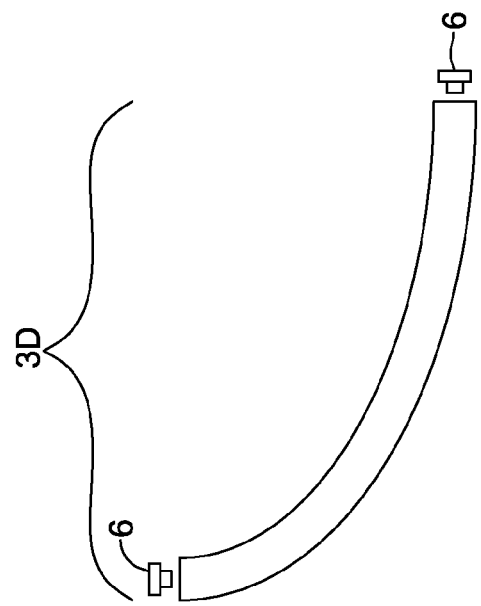
FIG. 5 is a cross-sectional drawing of another example panel for the light fixture of FIG. 1.
Figure 5:
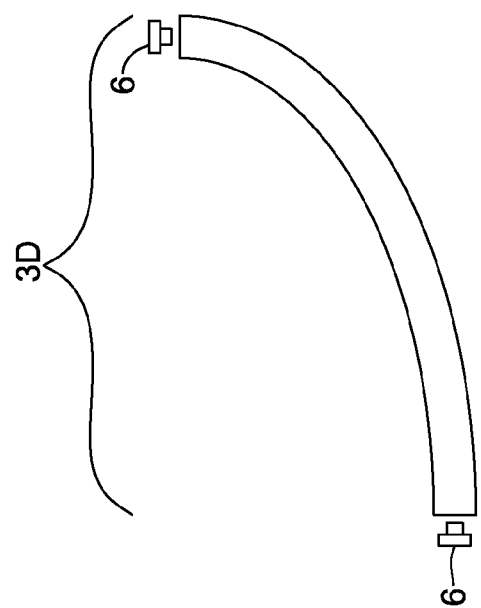

For instance, FIG. 2 shows a panel 3A having the generally cylindrical shape of panel 3 from FIG. 1, but with illumination from only one set of LEDs 6, located around the lateral edge of the panel 3A. FIG. 3 shows a panel 3B having the generally cylindrical shape of panel 3 from FIG. 1, but with illumination from only one set of LEDs 6, located near the topmost edge of the lining in the indentation. FIG. 4 shows a panel 3C having an enlarged curved portion, compared with the generally cylindrical shape of FIGS. 1-3, and illumination from only one set of LEDs 6, located around the lateral edge of the panel 3C. The panel 3C may be referred to as "funnel-shaped". FIG. 5 shows a panel 3D having the shape of panel 3C from FIG. 4, but with illumination from two sets of LEDs 6.

Figure 6:
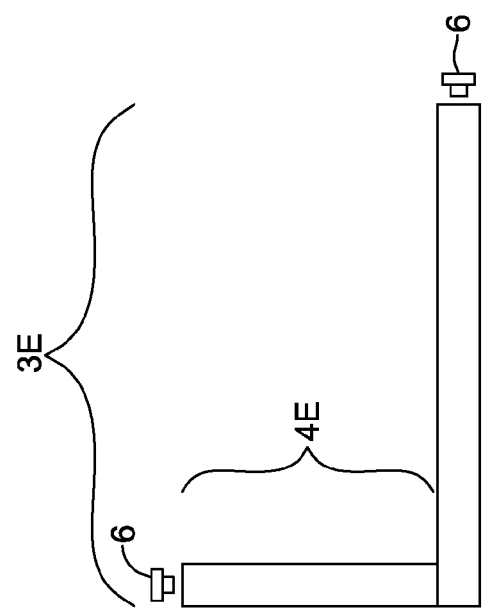
FIG. 6 is a cross-sectional drawing of another example panel for the light fixture of FIG. 1.
Figure 6:
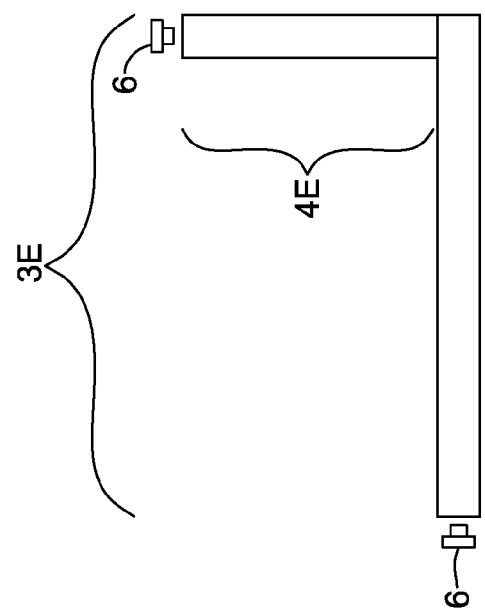
Figure 7:
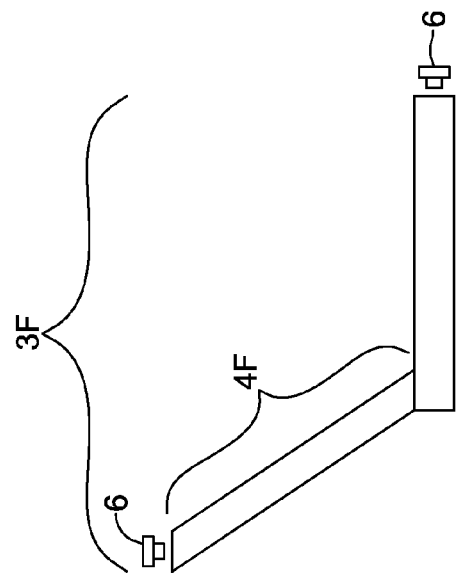
FIG. 7 is a cross-sectional drawing of another example panel for the light fixture of FIG. 1.
Figure 7:
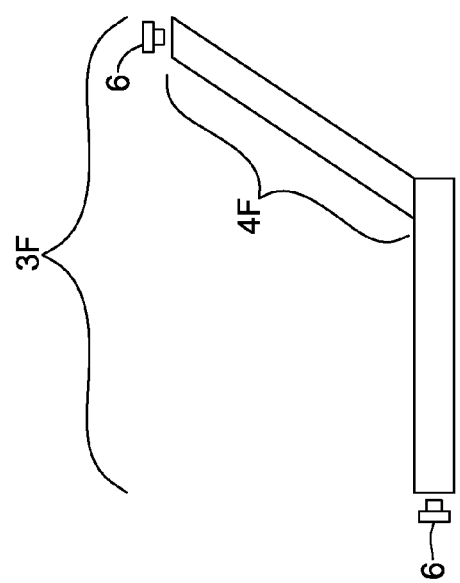

FIGS. 1-5 show panels 3, 3A-3D having the linings in their indentations formed integrally as a single unit. There are other configurations in which the lining may be formed as a separate element from the rest of the panel. For instance, FIG. 6 shows a panel 3E having a separate lining 4E. In this example, the panel 3E and lining 4E are each illuminated with their own respective set of LEDs 6. In the example of FIG. 6, the geometry is rectangular in cross-section, so that the lining 4E forms a true cylinder. Other geometries are possible, including the conical geometry shown in the panel 3F and lining 4F of FIG. 7. In general, the indentations may have any suitable curved or straight shape, including flat, convex, concave, a combination of convex and concave, and different portions may optionally have different curvatures and/or different concavities.

Figure 8:
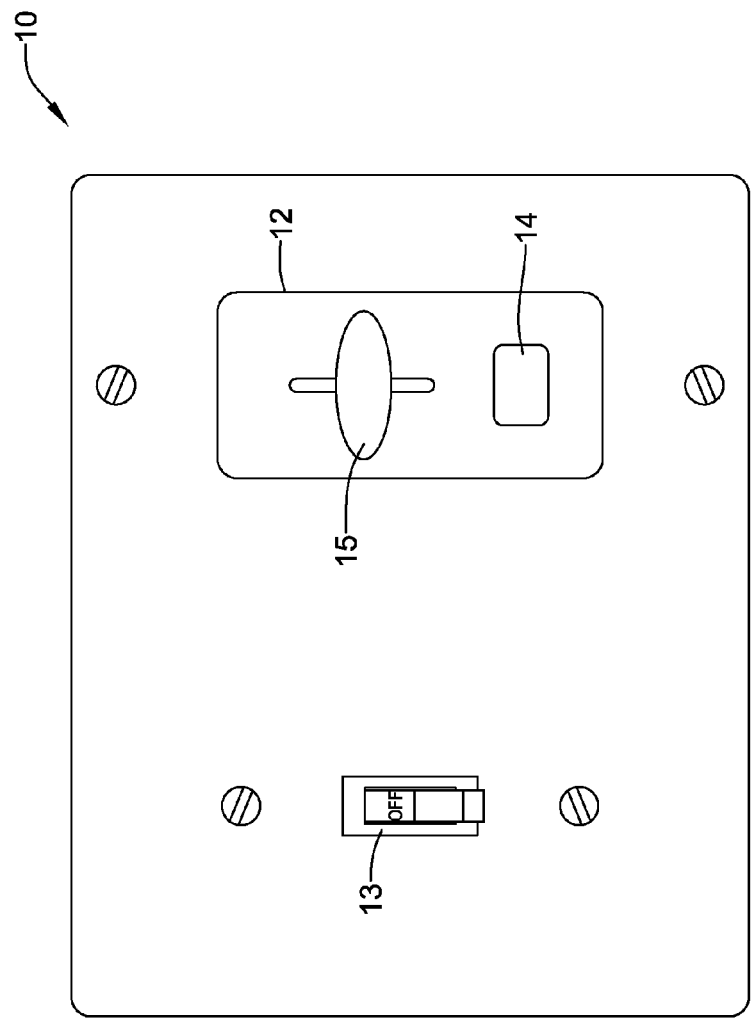
FIG. 8 is a front-view drawing of an example combination switch and dimmer for the panel and downlight of the light fixture of FIG. 1.

In some cases, the diffuse light 31 from the fixture 1 may have a fixed brightness level, while the directional beam 21 may have a variable brightness level. Such a fixture may be controllable from a switch 10, as shown in FIG. 8. The switch 10 may have a fixed switch 13 for the diffuse light 31, and a variable switch 12 for the directional beam 21. The variable switch 12 may include an on/off toggle 14 and a dimmer level 15. In other cases, other suitable switches may be used.

Figure 9:
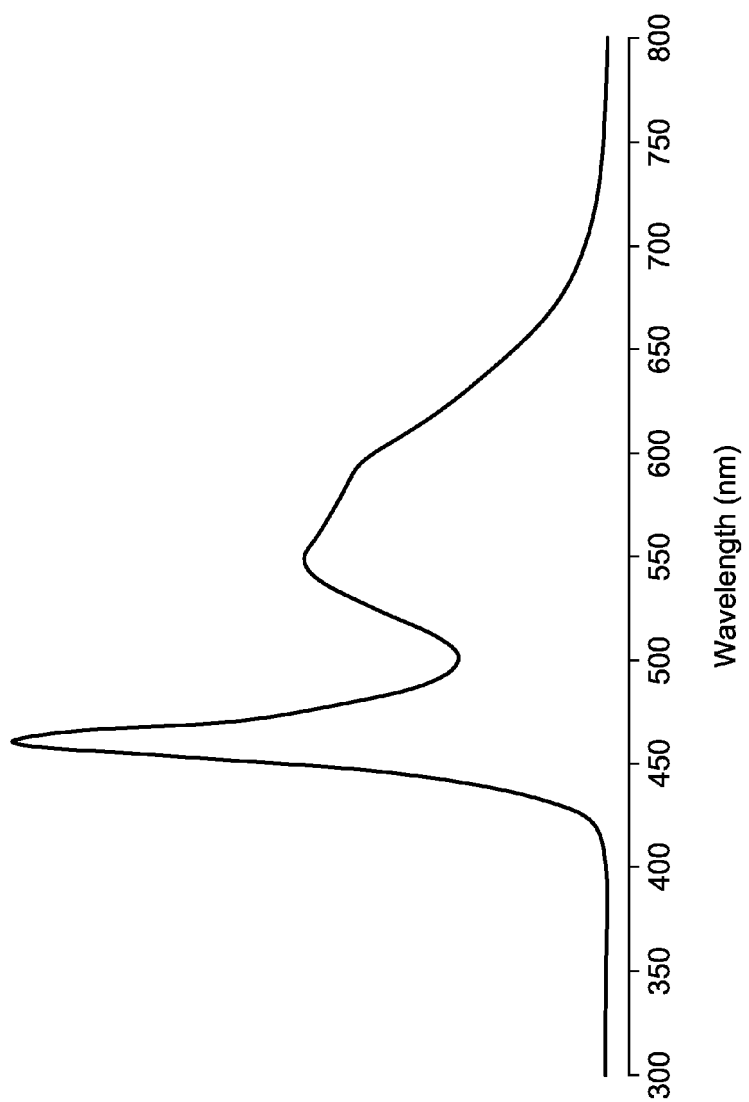
FIG. 9 is a plot of an example spectral profile for a phosphor-based white-light light emitting diode.

FIG. 9 shows an example spectrum from a typical phosphor-based white-light LED. In this example, the peak around 450 nm may be due to the blue excitation wavelength emitted by the LED chip, and the broad peak from about 500 nm to 600 nm may be due to the phosphor emission. In general, if more than one set of LEDs is illuminating the panel 3 and the lining 4, it may be desirable to use LEDs having the same emission spectrum, so that the panel 3 does not show color variation from location to location.

For the downlight 2, there may be cases where it is desirable to have the color of the directional beam 21 match the color of the diffuse light 31; in these cases, the LEDs 6 and 22 have the same emission spectrum, such as the spectrum shown in FIG. 9.

Figure 10:
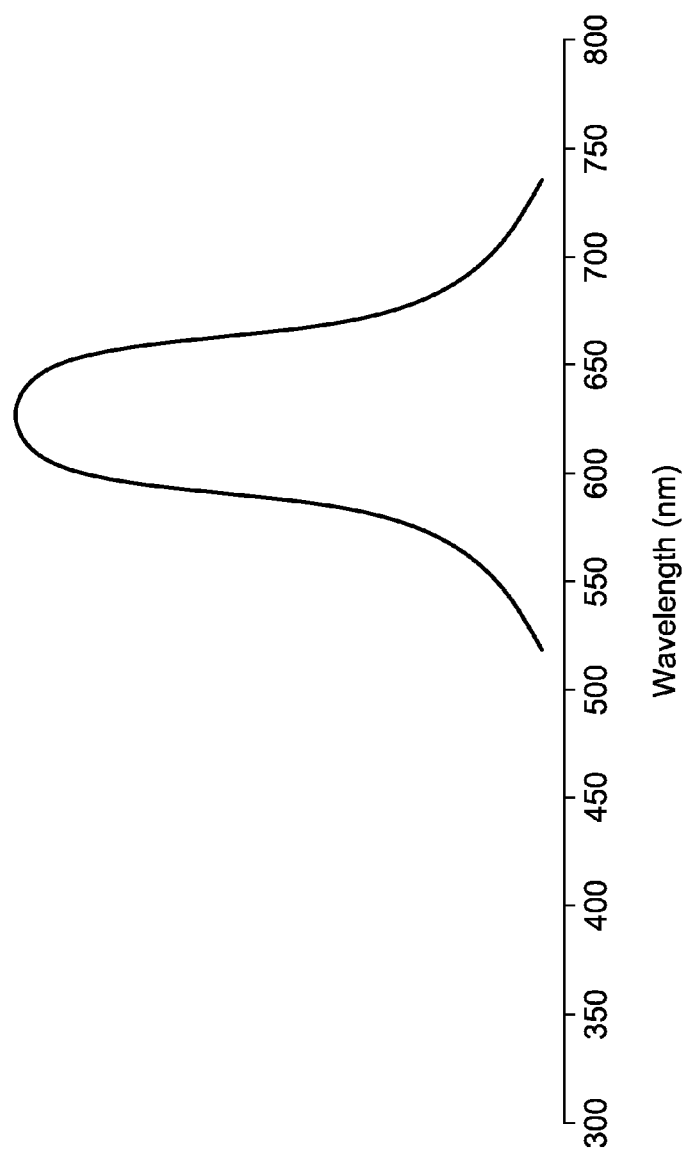
FIG. 10 is a plot of an example spectral profile for a single-wavelength light emitting diode.

In other cases, it may be desirable to deliberately mismatch the colors of the directional beam 21 and the diffuse light 31, such as for emphasis or other visual effect. In those cases, the diffuse light 31 may have the spectrum shown in FIG. 9, while the directional beam 21 may have a different spectrum. For example, the light fixture 1 may produce the effect of a warm white ray emerging from a blue cloud. Some believe that viewing of such a scene may produce health benefits, such as the inhibition of melatonin. Any or all of the light sources in the downlight 2 may be single-wavelength LEDs, rather than white-light LEDs. An example color for a single-wavelength LED may be red, with a spectrum as shown in FIG. 10, although any suitable color or plurality of colors may be used.

As an example of how such a fixture 1 may be used in practice, the fixture 1 may be incorporated into a ceiling tile, such as those used with a hanging grid. The tile having a fixture 1 may be sold as part of a kit, where other tiles in the kit have no fixture, and still other tiles in the kit may have a generally flat panel and no downlight. Other configurations may be used as well.

Unless otherwise stated, use of the words "substantial" and "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A light fixture for producing downward-propagating illumination, comprising:
   a downward-facing panel producing diffuse light, the panel being generally flat and having an indentation, the indentation having a lining that produces diffuse light, the panel and the lining having essentially the same luminance; wherein the downward-facing panel has a rectangular surface in plane parallel with a ceiling surface and has four edges of the rectangular surface sized and dimensioned to be received within a ceiling tile cavity used with a hanging grid ceiling;
   a downlight recessed into the indentation, the downlight producing a directional beam that emerges downward from within the indentation, the directional beam having a luminance controllable separately from the diffuse light wherein the indentation produces a curved and funnel-shaped surface around the circumference of the indentation and within a center region of the rectangular surface extending from the generally flat rectangular surface of the downward-facing panel to a surface of the recessed downlight.

2. The light fixture of claim 1, wherein the panel and the lining have the same surface luminance.

3. The light fixture of claim 1,
   wherein the fixture is controlled by an on/off switch and a dimmer switch;
   wherein the on/off switch controls both the panel and the lining; and
   wherein the dimmer switch controls the downlight.

4. The light fixture of claim 1,
   wherein the indentation is generally cylindrical;
   wherein the downlight is disposed at the top of the cylinder; and
   wherein the lining extends from the panel up at least a portion of a lateral wall of the cylinder.

5. The light fixture of claim 4,
   wherein the lining is illuminated by at least one light emitting diode disposed near the topmost edge of the lining in the indentation; and
   wherein the panel is illuminated by at least one light emitting diode disposed around a lateral edge of the panel.

6. The light fixture of claim 1,
   where the indentation is funnel-shaped;
   wherein the downlight is disposed at a hole at an apex of the funnel; and
   wherein the lining is integral with the panel and extends up at least a portion of the funnel.

7. The light fixture of claim 6, wherein the panel and the lining are both illuminated by at least one light emitting diode disposed around a lateral edge of the panel.

8. The light fixture of claim 1,
   wherein the lining is formed separately from the panel; and
   wherein the lining and the panel are illuminated by different light sources; and
   wherein the different light sources are controlled by a common switch.

9. The light fixture of claim 8,
   wherein the panel is illuminated by a first plurality of light emitting diodes, the diodes in the first plurality all having the same spectral profile; and
   wherein the lining is illuminated by a second plurality of light emitting diodes, the diodes in the second plurality all have the same spectral profile; and
   wherein the spectral profiles of the first and second pluralities of light emitting diodes are the same.

10. The light fixture of claim 9,
    wherein the downlight includes a plurality of downlight light emitting diodes that produce the directional beam; and
    wherein the downlight light emitting diodes have a spectral profile the same as the first and second pluralities.

11. The light fixture of claim 9,
    wherein the downlight includes a plurality of downlight light emitting diodes that produce the directional beam; and
    wherein the downlight light emitting diodes have a spectral profile different from the first and second pluralities.

12. The light fixture of claim 1,
    wherein the lining is integral with the panel; and
    wherein the lining and the panel are illuminated by the same light sources.

13. The light fixture of claim 12, wherein the panel is illuminated by a first plurality of light emitting diodes, the diodes in the first plurality all having the same spectral profile.

14. The light fixture of claim 13,
    wherein the downlight includes a plurality of downlight light emitting diodes that produce the directional beam; and
    wherein the downlight light emitting diodes have a spectral profile the same as the first plurality.

15. The light fixture of claim 13,
    wherein the downlight includes a plurality of downlight light emitting diodes that produce the directional beam; and
    wherein the downlight light emitting diodes have a spectral profile different from the first plurality.

16. The light fixture of claim 1, wherein the indentation is centered on the panel.

17. The light fixture of claim 1, wherein the downlight itself is visible only over a limited area directly underneath the indentation.

18. A light fixture for producing downward-propagating illumination, comprising
    a generally flat downward-facing light-emitting surface substantially extending in a plane in a perpendicular direction to the downward-propagating illumination and has a rectangular planar surface in plane parallel with a ceiling surface, the light-emitting surface having a central portion and having an upward-extending indentation in the central portion, the light-emitting surface extending upward at least partially into the indentation, the light-emitting surface having an aperture at the apex of the indentation; wherein the aperture extends upward beyond the light-emitting surface wherein the light-emitting surface at a circumference of the indentation produces a curved, conical surface extending from the generally flat rectangular surface of the downward-facing panel to a circumference of the recessed downlight; and a downlight disposed within the aperture, the downlight emitting a directional beam downward out of the light fixture through the indentation;

wherein the downlight has a brightness that is controllable and is independent of a brightness of the light-emitting surface.

19. The light fixture of claim 18, wherein the downlight itself is visible only over a limited area directly underneath the indentation.

20. A method for disguising a downlight in a downward-facing flat-panel light fixture, the method comprising:

providing a generally flat downward-facing light-emitting surface on the light fixture; wherein the generally flat downward-facing light-emitting surface is in the same plane provided by a bottom, exposed surface of a hanging grid ceiling;

providing an upward recess extending past the downward-facing light-emitting surface in a central portion of the light-emitting surface, the light-emitting surface extending upward at least partially into the recess;

providing an aperture at the center of the recess;

providing an angled surface extending from a outer circumference of the upward recess to a outer circumference of the aperture;

providing a downlight disposed within the aperture, the downlight emitting a directional beam out of the light fixture downward through the recess wherein the downlight has a brightness that is controllable and is independent of a brightness of the light-emitting surface; and wherein the downlight itself is visible only over a limited area directly underneath the indentation.

* * * * *